United States Patent
Shigemitsu et al.

(10) Patent No.: US 9,366,839 B2
(45) Date of Patent: Jun. 14, 2016

(54) POSITION ADJUSTMENT DEVICE AND POSITION ADJUSTMENT METHOD

(71) Applicant: SHARP KABUSHIKI KAISHA, Osaka-shi, Osaka (JP)

(72) Inventors: Norimichi Shigemitsu, Osaka (JP); Hiroyuki Hanato, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 14/438,677

(22) PCT Filed: Sep. 27, 2013

(86) PCT No.: PCT/JP2013/076374
§ 371 (c)(1),
(2) Date: Apr. 27, 2015

(87) PCT Pub. No.: WO2014/069135
PCT Pub. Date: May 8, 2014

(65) Prior Publication Data
US 2015/0247987 A1  Sep. 3, 2015

(30) Foreign Application Priority Data

Nov. 1, 2012 (JP) ................. 2012-242117

(51) Int. Cl.
| | | |
|---|---|---|
| *H04N 5/225* | (2006.01) | |
| *G02B 7/28* | (2006.01) | |
| *G02B 7/02* | (2006.01) | |
| *G03B 17/00* | (2006.01) | |
| *G03B 43/00* | (2006.01) | |

(Continued)

(52) U.S. Cl.
CPC ............ *G02B 7/023* (2013.01); *G02B 13/0015* (2013.01); *G03B 17/00* (2013.01); *G03B 43/00* (2013.01); *H04N 5/2253* (2013.01);

(Continued)

(58) Field of Classification Search
CPC ..................................................... H04N 5/2254
USPC ................................................. 348/175, 360
See application file for complete search history.

(56) References Cited

FOREIGN PATENT DOCUMENTS

| JP | 2005-86659 | 3/2005 |
| JP | 2006-148662 | 6/2006 |

(Continued)

OTHER PUBLICATIONS

International Search Report for PCT/JP2013/076374 mailed Oct. 22, 2013, two pages.

(Continued)

*Primary Examiner* — Joel Fosselman
(74) *Attorney, Agent, or Firm* — Nixon & Vanderhye, P.C.

(57) ABSTRACT

To make it possible to adjust a relative positional relationship between an imaging lens and an image pickup device highly precisely within a short period of time, a position adjusting device includes: an image pickup device rotating and holding section (101) for holding an image pickup device (202) at any one of three or more rotational angles; a relationship information obtaining section (103) for obtaining, for each of respective images captured at the rotational angles, information on a relationship between the corresponding rotational angle and a contrast of the image at a plurality of points or regions in the image; a line approximation section (104) for approximating the relationship with use of an approximation line; and an image pickup device adjusting section (105) for rotating the image pickup device (202) so that the image pickup device (202) is held at a rotational angle corresponding to a position at which a plurality of the approximation lines cross each other.

5 Claims, 19 Drawing Sheets

(51) Int. Cl.
  *G02B 13/00* (2006.01)
  *H04N 17/00* (2006.01)
(52) U.S. Cl.
  CPC ............ *H04N5/2254* (2013.01); *H04N 5/2257* (2013.01); *H04N 17/002* (2013.01)

(56) References Cited

FOREIGN PATENT DOCUMENTS

| JP | 2006-319544 | 11/2006 |
| JP | 2009-302837 | 12/2009 |
| JP | 2011-70072 | 4/2011 |
| JP | 2011-133509 | 7/2011 |
| JP | 2011-175019 | 9/2011 |
| JP | 2011-205263 | 10/2011 |
| JP | 2012-27063 | 2/2012 |

OTHER PUBLICATIONS

Non-English Written Opinion of the ISA for PCT/JP2013/076374 mailed Oct. 22, 2013, three pages.
Japanese Office Action issued on Mar. 8, 2016 of the corresponding Japanese patent application No. 2014-544387.

FIG. 8

| APPLIED DATA, SIMULATION CONDITIONS | | |
|---|---|---|
| Spec. | 1/2.5-type, 20M, 5P | |
| Object distance/mm | 500 | |
| FOV(D)/2 /deg | 37 | |
| Image Height /mm | h1.0 | 376.8 |
| | h0.6 | 226.1 |

F I G. 1 5
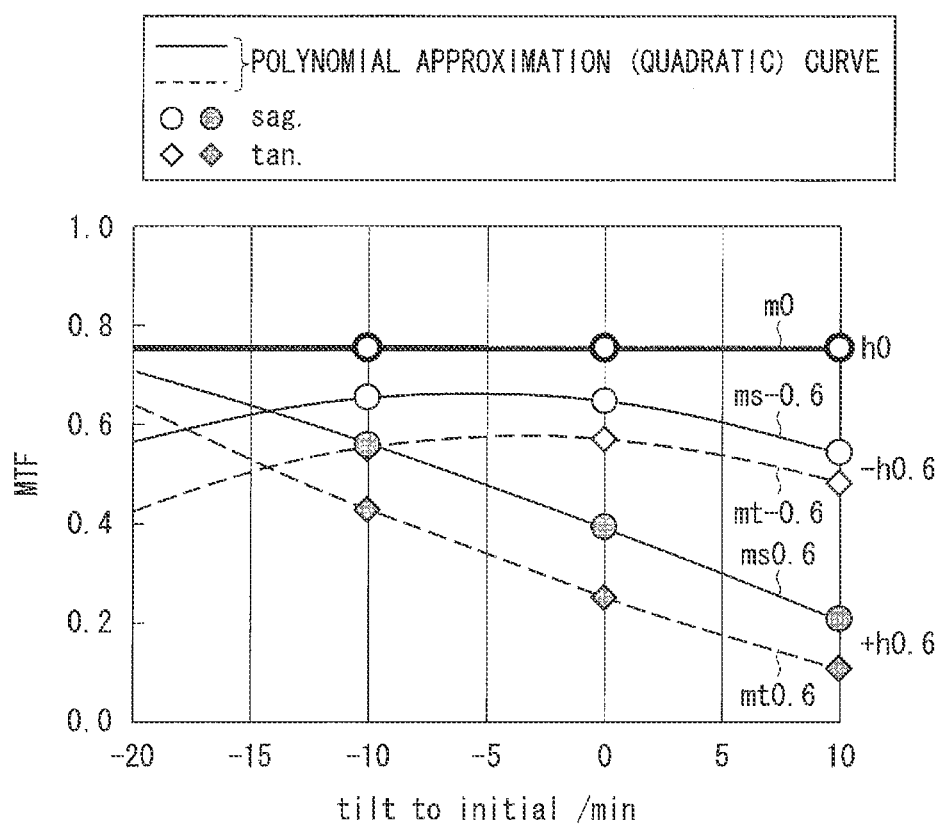

F I G. 2 2
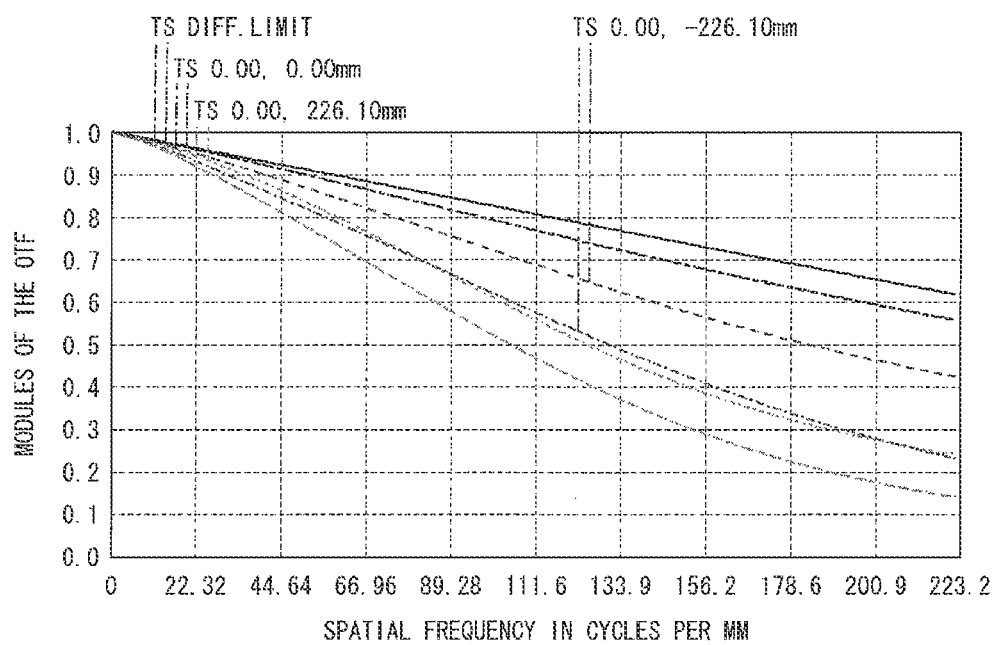
F I G. 2 3
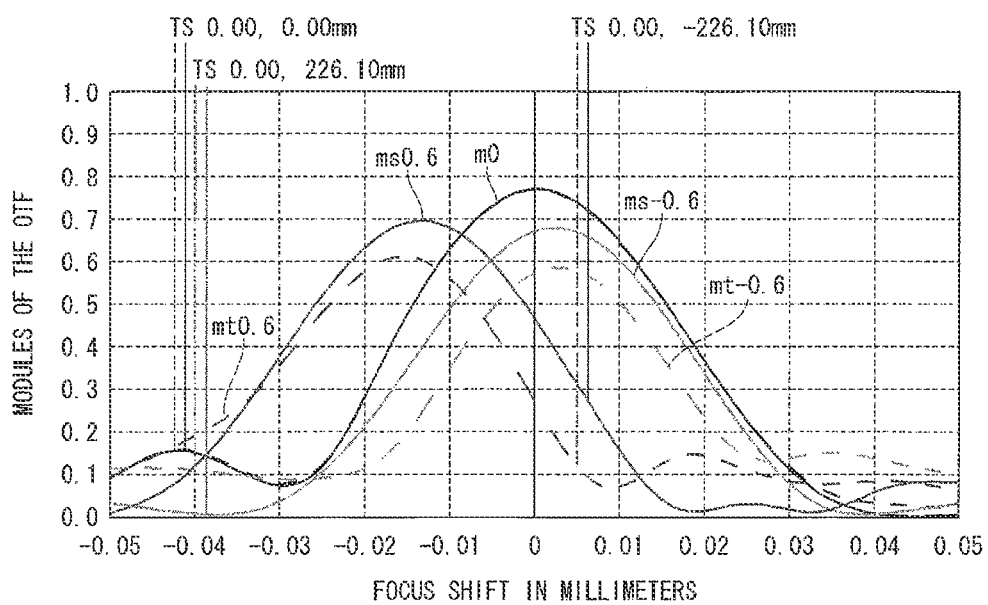

F I G. 24
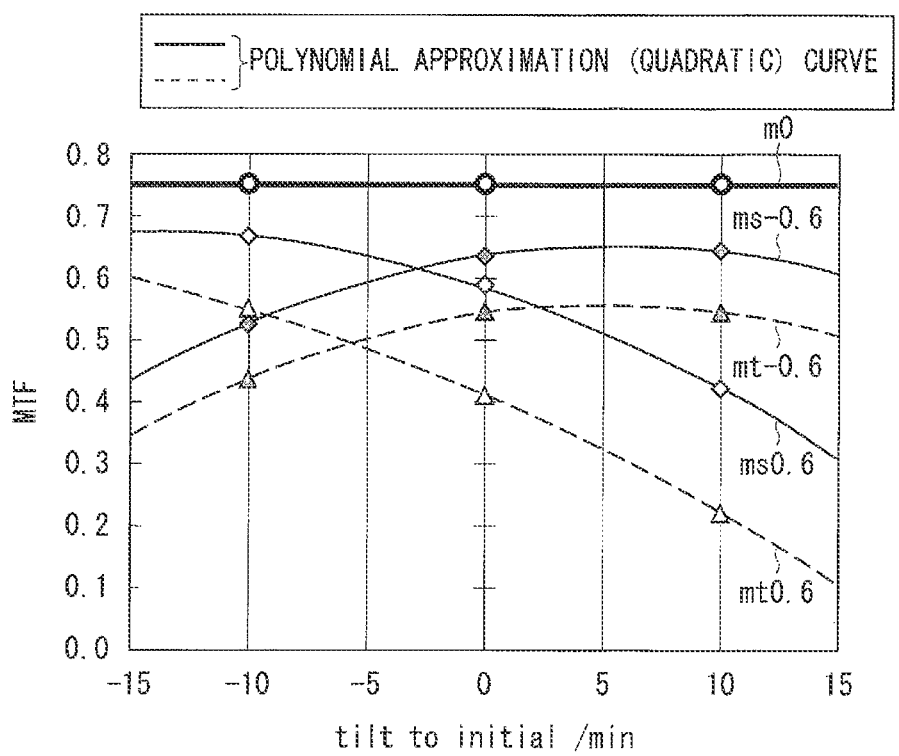

POSITION ADJUSTMENT DEVICE AND POSITION ADJUSTMENT METHOD

This application is the U.S. national phase of International Application No. PCT/JP2013/076374 filed 27 Sep. 2013 which designated the U.S. and claims priority to JP Patent Application No. 2012-242117 filed 1 Nov. 2012, the entire contents of each of which are hereby incorporated by reference.

TECHNICAL FIELD

The present invention relates to a position adjusting device and position adjusting method each for adjusting a relative positional relationship between an imaging lens and an image pickup device.

BACKGROUND ART

With increasingly higher resolution of camera modules in recent years, there are growing demands for a mounting technique that allows highly precise adjustment of a relative positional relationship between an imaging lens and an image pickup device.

Conventional techniques are known for adjusting a relative positional relationship between an imaging lens and an image pickup device with reference to an outline and an appearance of the camera module. As an example, Patent Literature 1 discloses a technique of capturing an image of an actuator with use of an imaging device and adjusting a relative positional relationship between an optical axis of an imaging lens and a center of an image pickup device on the basis of a gloss, a color, and the image of the actuator.

However, there have recently been growing demands for positional adjustment with precision higher than positional adjustment with reference to the outline and the appearance of a camera module as disclosed in Patent Literature 1.

Patent Literature 2 discloses a technique of (i) providing a camera module body in an adjustment frame, (ii) adjusting the position of the camera module body on the basis of an image signal of a test image pickup device which image signal has been obtained from the camera module body, and (iii) bonding and fixing, to the adjustment frame, the camera module body whose position has been adjusted.

Patent Literature 3 discloses a technique of capturing an image of a measurement chart and adjusting a relative positional relationship between an imaging lens and an image pickup device on the basis of positional information of a mark in the image captured. Patent Literature 3 discloses that orientation of the image pickup device is controlled through capture of an image of the measurement chart with use of a reference lens and the image pickup device, while orientation of the image pickup device is controlled through capture of an image of the measurement chart with use of the imaging lens and a reference image pickup device.

The respective techniques disclosed in Patent Literatures 2 and 3 both use an image signal for the purpose of adjusting the relative positional relationship between an imaging lens and an image pickup device. However, the techniques each require an image pickup device not to be mounted on a camera module as a finished product. As a result, the respective techniques disclosed in Patent Literatures 2 and 3 may complicate a process of manufacturing the camera module. The complication of the process of manufacturing the camera module may cause an error in the relative positional relationship between an imaging lens and an image pickup device (to be mounted on a camera module as a finished product) when the image pickup device is mounted on the imaging lens.

In view of the risk, there have been known techniques for directly adjusting a relative positional relationship between an imaging lens and an image pickup device while capturing an image with use of only an image pickup device to be mounted in a camera module as a finished product. Such techniques are disclosed in Patent Literatures 4 and 5, for example.

Patent Literature 4 discloses a technique of obtaining an imaging signal for each of a plurality of measurement positions set along an optical axis of an imaging lens while moving the imaging lens to the measurement positions, and for automatically adjusting, on the basis of the imaging signals, (i) the position of the image pickup device in the optical axis direction and (ii) respective slopes of two axes intersecting with the optical axis at right angles.

Patent Literature 5 discloses a technique for quantitatively detecting the slope of an image pickup device on the basis of data on a plurality of images captured, with use of a fixed image pickup device, of a measurement chart moving along an optical axis of the imaging lens.

Both of the respective techniques disclosed in Patent Literatures 4 and 5 adjust the slope of an image surface of an imaging lens with high precision. Therefore, the techniques each allow high-precision adjustment suitable for the configuration of the camera module.

CITATION LIST

Patent Literatures

Patent Literature 1
Japanese Patent Application Publication, Tokukai, No. 2012-27063 (Publication Date: Feb. 9, 2012)
Patent Literature 2
Japanese Patent Application Publication, Tokukai, No. 2011-175019 (Publication Date: Sep. 8, 2011)
Patent Literature 3
Japanese Patent Application Publication, Tokukai, No. 2011-133509 (Publication Date: Jul. 7, 2011)
Patent Literature 4
Japanese Patent Application Publication, Tokukai, No. 2009-302837 (Publication Date: Dec. 24, 2009)
Patent Literature 5
Japanese Patent Application Publication, Tokukai, No. 2006-319544 (Publication Date: Nov. 24, 2006)
Patent Literature 6
Japanese Patent Application Publication, Tokukai, No. 2005-86659 (Publication Date: Mar. 31, 2005)

SUMMARY OF INVENTION

Technical Problem

The respective techniques disclosed in Patent Literatures 4 and 5 each require obtaining information on a relationship of a resolving power of the camera module to a focus shift position of the imaging lens, that is, a defocus characteristic. The techniques disclosed in Patent Literatures 4 and 5 thus each need to (i) control the imaging lens so as to move the imaging lens to each of the focus shift positions and (ii) obtain an output signal of the image pickup device for each of the focus shift positions. The techniques each involve a large amount of data during adjustment, especially for a camera module that requires high-precision adjustment of the relative positional relationship between the imaging lens and the image pickup device.

As a result, the respective techniques disclosed in Patent Literatures 4 and 5 each pose the following problem: When the relative positional relationship between the imaging lens and the imaging sensor is adjusted with high precision, the techniques each require a long measurement period and consequently a long adjustment period.

In a case where an imaging lens has rotationally asymmetric aberration, the imaging lens may have, around an image, a portion having a low resolving power (so called one-sided blur). Patent Literatures 4 and 5 each disclose that image surface positions at each of which the resolving power is the largest are caused to coincide with each other at a plurality of image heights. Patent Literatures 4 and 5, however, each fail to disclose adjustment intended to intensively reduce a one-sided blur.

The present invention has been achieved in view of the above problems. It is an object of the present invention to provide a position adjusting device and a position adjusting method each of which makes it possible to adjust a relative positional relationship between an imaging lens and an image pickup device highly precisely within a short period of time.

Solution to Problem

In order to solve the problems, a position adjusting device according to an aspect of the present invention is a position adjusting device for adjusting a relative positional relationship between an imaging lens and an image pickup device, the position adjusting device including: an image pickup device rotating and holding section for rotating the image pickup device and holding the image pickup device at any one of at least three rotational angles, the rotational angles each being an angle of rotation from (i) an orientation in which the image pickup device faces a direction perpendicular to an optical axis of the imaging lens to (ii) an orientation in which the image pickup device faces a direction of the optical axis; a relationship information obtaining section for obtaining, for each of respective images captured at the rotational angles with use of the imaging lens and the image pickup device, information on a relationship between a corresponding rotational angle and a contrast of the image at a plurality of points or regions in the image; a line approximation section for performing approximation on the relationship with use of a straight line or a curve; and an image pickup device adjusting section for adjusting a position of the image pickup device by rotating the image pickup device so that the image pickup device is held at that one of the rotational angles which corresponds to a position at which a plurality of the straight lines or the curves obtained from the approximation cross each other.

A position adjusting method according to an aspect of the present invention is a position adjusting method for adjusting a relative positional relationship between an imaging lens and an image pickup device, the position adjusting method including the steps of: (a) rotating the image pickup device and holding the image pickup device at any one of at least three rotational angles, the rotational angles each being an angle of rotation from (i) an orientation in which the image pickup device faces a direction perpendicular to an optical axis of the imaging lens to (ii) an orientation in which the image pickup device faces a direction of the optical axis; (b) obtaining, for each of respective images captured at the rotational angles with use of the imaging lens and the image pickup device, information on a relationship between a corresponding rotational angle and a contrast of the image at a plurality of points or regions in the image; (c) performing approximation on the relationship with use of a straight line or a curve; and (d) adjusting a position of the image pickup device by rotating the image pickup device so that the image pickup device is held at that one of the rotational angles which corresponds to a position at which a plurality of the straight lines or the curves obtained from the approximation in the step (c) cross each other.

Advantageous Effects of Invention

An aspect of the present invention advantageously makes it possible to adjust the relative positional relationship between the imaging lens and the image pickup device highly precisely within a short period of time.

BRIEF DESCRIPTION OF DRAWINGS

FIG. 5 shows (i) a case where the image pickup device is disposed so as to have a light receiving surface at a rotational angle A and (ii) a case where the image pickup device is disposed so as to have a light receiving surface at a rotational angle B.

FIG. 6 shows an example case where a one-sided blur occurs when the light receiving surface has the rotational angle A.

FIG. 7 shows an example case where a one-sided blur is reduced when the light receiving surface has the rotational angle B.

FIG. 8 is a table that shows design data and design conditions for the camera module.

FIG. 15 is a graph showing, as to Verification 1, results of curve approximation performed by a relationship information obtaining section and a line approximation section on the basis of the defocus MTF illustrated in each of FIGS. 10, 12, and 14.

FIG. 22 is a graph showing, as to Verification 2, a relationship between a spatial frequency and a MTF for a case where the image pickup device inclined, from the initial value with respect to the optical axis, by −10 min as a "Measurement 2" of the rotational angle of the image pickup device.

FIG. 23 is a graph showing, as to Verification 2, a relationship between a focus shift position and a MTF for a case where the image pickup device is inclined, from the initial value with respect to the optical axis, by −10 min as a "Measurement 2" of the rotational angle of the image pickup device.

FIG. 24 is a graph showing, as to Verification 2, results of curve approximation performed by the relationship information obtaining section and the line approximation section, on the basis of the defocus MTF illustrated in each of FIGS. 19, 21, and 23.

DESCRIPTION OF EMBODIMENTS (Configuration of Camera Module)

Figure 2:
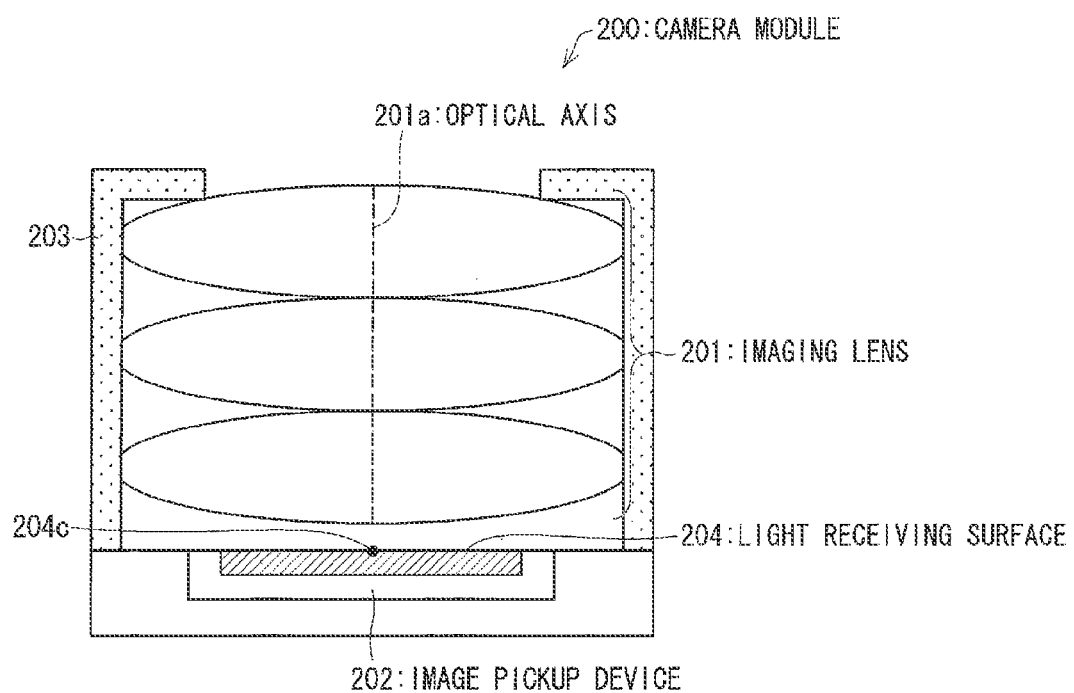
FIG. 2 is a cross-sectional view schematically illustrating an example configuration of a camera module.

FIG. 2 is a cross-sectional view schematically illustrating an example configuration of a camera module.

A camera module 200 illustrated in FIG. 2 includes an imaging lens 201 and an image pickup device 202.

The imaging lens 201 forms an image of an object as a target of image pickup by the camera module 200. Note that while the imaging lens 201 has three lenses, the imaging lens 201 may have fewer than or more than three lenses. Moreover, the imaging lens 201 is contained in a lens barrel 203. However, the imaging lens 201 may be contained in a lens holder (not illustrated) instead of the lens barrel 203. The camera module 200 may further alternatively be arranged such that the imaging lens 201 is contained in the lens barrel 203 and that the lens barrel 203 is contained in the lens holder.

The image pickup device 202 receives, at a light receiving surface 204, light that has passed through the imaging lens 201, and converts the light thus received into electric signals. The image pickup device 202 includes, for example, a charge coupled device (CCD) or a complementary metal oxide semiconductor (CMOS).

The camera module 200 captures an image of an object with use of the imaging lens 201 and the image pickup device 202.

The camera module 200 is, for example, a publicly known camera module including an imaging lens 201 and an image pickup device 202. The camera module 200 may further include (i) a cover glass (not illustrated) that protects a light receiving surface 204 of the image pickup device 202, (ii) a mechanism (not illustrated) for achieving an autofocus function by displacing the imaging lens 201 in a direction of an optical axis 201a (of the imaging lens 201), and (iii) a mechanism (not illustrated) for achieving an image stabilization function by displacing the imaging lens 201 in a direction perpendicular to the optical axis 201a.

In the camera module 200, the imaging lens 201 and the image pickup device 202 are, for example, ideally arranged such that the light receiving surface 204 of the image pickup device 202 has a center 204c on an extension of the optical axis 201a of the imaging lens 201, and that the light receiving surface 204 is disposed perpendicular to the optical axis 201a.

A position adjusting device described below according to the present embodiment adjusts a relative positional relationship between the imaging lens 201 and the image pickup device 202 so as to achieve the above ideal positional relationship between the imaging lens 201 and the image pickup device 202 in the camera module 200.

(Arrangement of Position Adjusting Device)

Figure 1:
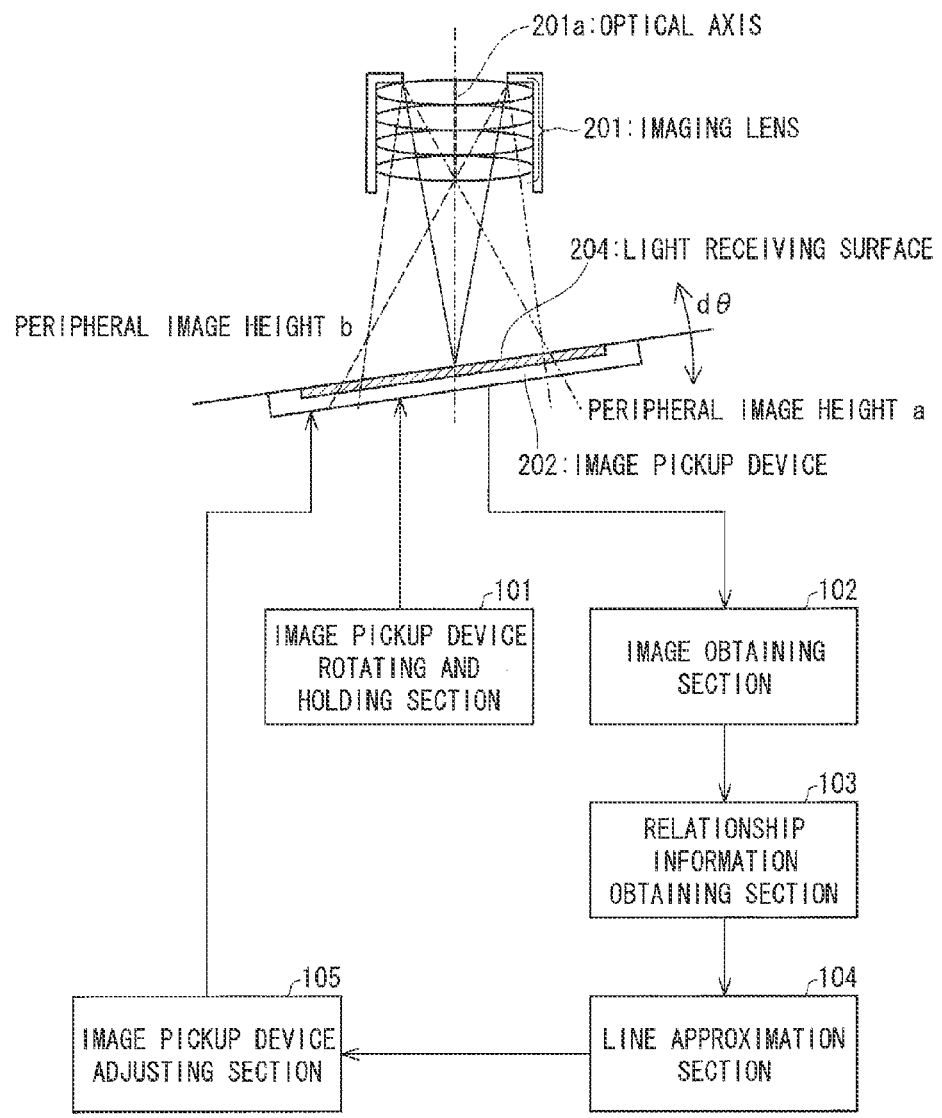
FIG. 1 is a top view schematically illustrating a configuration of a position adjusting device according to an embodiment of the present invention.

FIG. 1 is a top view schematically illustrating a configuration of a position adjusting device according to the present embodiment.

The position adjusting device illustrated in FIG. 1 includes an image pickup device rotating and holding section 101, an image obtaining section 102, a relationship information obtaining section 103, a line approximation section 104, and an image pickup device adjusting section 105.

The image pickup device rotating and holding section 101 rotates the image pickup device 202 from an orientation in which the image pickup device 202 faces a direction perpendicular to the optical axis 201a of the imaging lens 201 to an orientation in which the image pickup device 202 faces a direction of the optical axis 201a, and/or rotates the image pickup device 202 in the opposite direction. In other words, the image pickup device rotating and holding section 101, for example, rotates the image pickup device 202 in rotation directions dθ illustrated in FIG. 1. This rotation allows the image pickup device rotating and holding section 101 to hold the image pickup device 202 at any one of at least three rotational angles.

A specific example of the image pickup device rotating and holding section 101 includes a base on which the image pickup device 202 is mounted and which is capable of rotating in a multistage or non-stage (continuous) manner from an orientation in which the base faces a direction perpendicular to the optical axis 201a to an orientation in which the base faces a direction of the optical axis 201a, and/or rotating in the opposite direction.

An image of an object (not illustrated) is formed by the imaging lens 201. Then, the image pickup device 202 receives light that has passed through the imaging lens 201 (for example, light which forms the image of the object through the imaging lens 201), and converts the light into electric signals. In other words, the camera module 200 (an unfinished product in which a relative positional relationship between the imaging lens 201 and the image pickup device 202 has not been adjusted) captures an image of the object. The object subjected to the imaging is, for example, a detection pattern including alignment marks, but is not limited to any particular object.

As described above, the image pickup device 202 is held at any one of at least three rotational angles by the image pickup device rotating and holding section 101. The imaging lens 201 and the image pickup device 202 capture an image of the object while the image pickup device 202 is held at each of the rotational angles. That is, an image is captured at each of the rotational angles of the image pickup device 202.

The image obtaining section 102 performs, on electric signals supplied from the image pickup device 202, publicly known predetermined image processing to generate image data.

Specifically, the image obtaining section 102 generates data on at least three images obtained through at least three imaging operations performed with use of the imaging lens 201 and the image pickup device 202. The image obtaining section 102 obtains each of these image data items as a captured image and then supplies the images thus captured to the relationship information obtaining section 103.

The relationship information obtaining section 103 obtains, for each of the respective images captured at the rotational angles of the image pickup device 202, information on a relationship between the corresponding rotational angle and a contrast of that image at a plurality of locations (points or regions) in the image. The relationship information obtaining section 103 supplies information indicating the relationships thus obtained to the line approximation section 104.

The line approximation section 104 performs, at a plurality of locations with use of a straight line or a curve (hereinafter referred to as an "approximation line"), approximation on each relationship obtained by the relationship information obtaining section 103.

The image pickup device adjusting section 105 adjusts a position of the image pickup device 202 by rotating the image pickup device 202 so that the image pickup device 202 is held at one of the rotational angles which corresponds to a position at which a plurality of the approximation lines obtained from the approximation with use of the line approximation section 104 cross each other.

A specific example of the image pickup device adjusting section 105 includes a base having an operation principle similar to the image pickup device rotating and holding section 101. Moreover, the image pickup device rotating and holding section 101 may double as the image pickup device adjusting section 105.

In the Description, a "contrast" is an indicator of a definition of an image, and indicates a resolving power (resolution) and/or illumination. It goes without saying that the contrast of the image captured by the camera module depends on (i) an object distance to the imaging lens included in the camera module and (ii) an image height (location) and the like of the image.

(Details of Operation of Position Adjusting Device)

Figure 3:
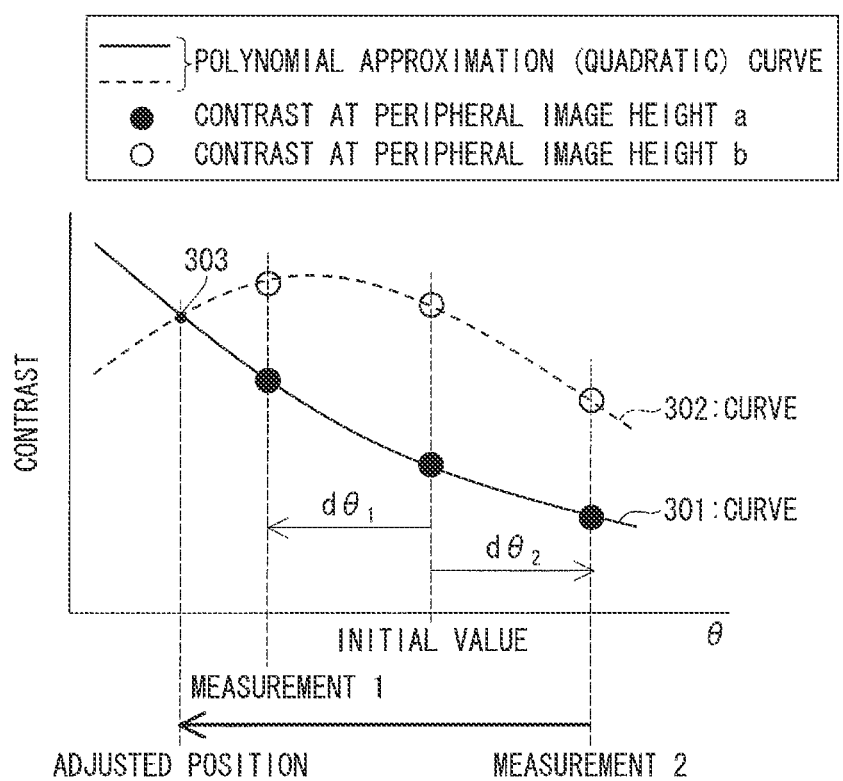
FIG. 3 is a graph showing an example of a relationship between a rotational angle of an image pickup device and a contrast of a captured image, which relationship is referred to the position adjusting device illustrated in FIG. 1.

With further reference to FIG. 3, the description below deals with operations of the image pickup device rotating and holding section 101, the relationship information obtaining section 103, the line approximation section 104, and the image pickup device adjusting section 105.

FIG. 3 is a graph showing an example of a relationship between a rotational angle of the image pickup device 202 and a contrast of a captured image, which relationship is referred to the position adjusting device illustrated in FIG. 1. The graph has (i) a horizontal axis indicative of a rotational angle (θ) of the image pickup device 202 and (ii) a vertical axis indicative of a contrast of the captured image. The rotational angle (θ) shown in the horizontal axis is a rotational angle on a surface formed by a direction perpendicular to the optical axis 201a and a direction of the optical axis 201a (in the present embodiment, the surface illustrated in FIG. 1). The contrast shown in the vertical axis has no unit for the convenience of description. A higher position in the graph indicates a better contrast.

First, the image pickup device rotating and holding section 101 holds the image pickup device 202 at an appropriate rotational angle. The rotational angle of the image pickup device 202 at this stage is indicated as an initial value in FIG. 3. The imaging lens 201 and the image pickup device 202 capture an image of an object while the rotational angle of the rotational angle of the image pickup device 202 has the initial value. The relationship information obtaining section 103 determines a contrast at a "peripheral image height a" and a contrast at a "peripheral height b", which serve as a plurality of locations in the captured image.

Next, the image pickup device rotating and holding section 101 rotates the image pickup device 202 by a predetermined angle $dθ_1$ and holds the image pickup device 202 at the predetermined angle $dθ_1$. The rotational angle of the image pickup device 202 at this time is indicated as "Measurement 1" in FIG. 3. The imaging lens 201 and the image pickup device 202 capture an image of an object while the rotational angle of the image pickup device 202 is at the "Measurement 1". The relationship information obtaining section 103 determines a contrast at the "peripheral image height a" and a contrast at the "peripheral image height b", which serve as a plurality of locations in the captured image.

Next, the image pickup device rotating and holding section 101 further rotates the image pickup device 202 by a predetermined angle $(-d\theta_1+d\theta_2)$ and holds the image pickup device 202 at the predetermined angle $(-d\theta_1+d\theta_2)$. The rotational angle of the image pickup device 202 at this time is indicated as "Measurement 2" in FIG. 3. The imaging lens 201 and the image pickup device 202 capture an image of an object while the rotational angle of the image pickup device 202 is at the "Measurement 2". The relationship information obtaining section 103 determines a contrast at the "peripheral image height a" and a contrast at the "peripheral height b", which serve as a plurality of locations in the captured image.

In other words, the relationship information obtaining section 103 determines the "peripheral image height a" as a common location in three captured images to be supplied from the image obtaining section 102 to the relationship information obtaining section 103 after the imaging lens 201 and the image pickup device 202 capture an image at each rotational angle of the image pickup device 202. Moreover, the relationship information obtaining section 103 determines the "peripheral image height b" as a common location in the three captured images. The relationship information obtaining section 103 then determines a contrast at the "peripheral image height a" and a contrast at the "peripheral height b" in each of the captured images.

There is a difference in each captured image between the position determined as the "peripheral image height a" and the position determined as the "peripheral image height b". Preferably, the "peripheral image height a" and the "peripheral image height b" are in a point symmetry relationship with each other with respect to the center of the captured image. This makes it possible to unify the anisotropy of the contrast at the same image height in the captured images.

The relationship information obtaining section 103 determines, in each of a total of three captured images obtained at the respective rotational angles of the image pickup device 202, a relationship between that rotational angle and a contrast of that captured image at each of the "peripheral image height a" and the "peripheral image height b". FIG. 3 shows (i) black points each indicative of the relationship at the "peripheral image height a" and (ii) white points each indicative of the relationship at the "peripheral image height b".

The line approximation section 104 performs, with use of an approximation line, approximation on the relationship as to the "peripheral image height a" which relationship has been obtained by the relationship information obtaining section 103. In other words, the line approximation section 104 creates a curve 301 that passes through all the three black points in FIG. 3.

Similarly, the line approximation section 104 performs, with use of an approximation line, approximation on the relationship as to the "peripheral image height b" which relationship has been obtained by the relationship information obtaining section 103. In other words, the line approximation section 104 creates a curve 302 that passes through all the three white points in FIG. 3.

FIG. 3 shows an example of the case where the line approximation section 104 performs a quadratic polynomial approximation. Preferably, the line approximation section 104 performs the approximation with use of the approximation line on a basis of any one of linear approximation, polynomial approximation, power approximation, and exponential approximation. Such approximation with use of an approximation line can be performed with use of publicly known techniques. A detailed description of the approximation is thus omitted.

The image pickup device adjusting section 105 identifies a rotational angle for the image pickup device 202 (adjustment position in FIG. 3) which rotational angle corresponds to a position 303 at which (i) a curve 301 approximating the above relationship as to the "peripheral image height a" and (ii) a curve 302 approximating the above relationship as to the "peripheral image height b" cross each other, both curves having been obtained from the approximation by the line approximation section 104. The image pickup device adjusting section 105 rotates the image pickup device 202 so as to adjust the position of the image pickup device 202 so that the image pickup device 202 will have the rotational angle identified.

(Examples of Peripheral Image Heights a and b)

Figure 4:
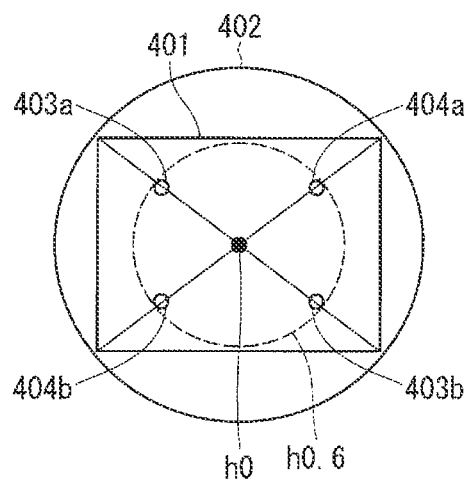
FIG. 4 is a diagram illustrating an example of a "peripheral image height a" and an example of a "peripheral image height b".

FIG. 4 is a diagram illustrating an example of the "peripheral image height a" and an example of the "peripheral image height b".

In the Description, the "image height" is an indicator of the height from the center of an image captured. More specifically, the image height indicates a distance to the center of an image in a horizontal direction in a direction perpendicular to the optical axis 201a.

The imaging lens 201 and the image pickup device 202 define an image capturing area 401 inside an effective image circle 402 of the imaging lens 201. A location in this image capturing area 401 generally corresponds to a location in the image captured. Therefore, the "peripheral image height a" and the "peripheral image height b" are described below in relation to the image capturing area 401.

On the assumption that the center of the image capturing area 401 is an image height h0, the "peripheral image height a" and the "peripheral image height b" are each, for example, determined as an image height h0.6, that is, the height that is 60% of the largest image height. That the "peripheral image height a" and the "peripheral image height b" are equal to each other means that the "peripheral image height a" and the "peripheral image height b" are preferably in a point symmetry relationship with each other with respect to the image height h0. Naturally, the "peripheral image height a" and the "peripheral image height b" may be unequal to each other.

As an example, the "peripheral image height a" and the "peripheral image height b" can be a point 403a and a point 403b, respectively. As another example, the "peripheral image height a" and the "peripheral image height b" can be a point 404a and a point 404b, respectively.

(Adjustment for One-Sided Blur)

Figure 5:
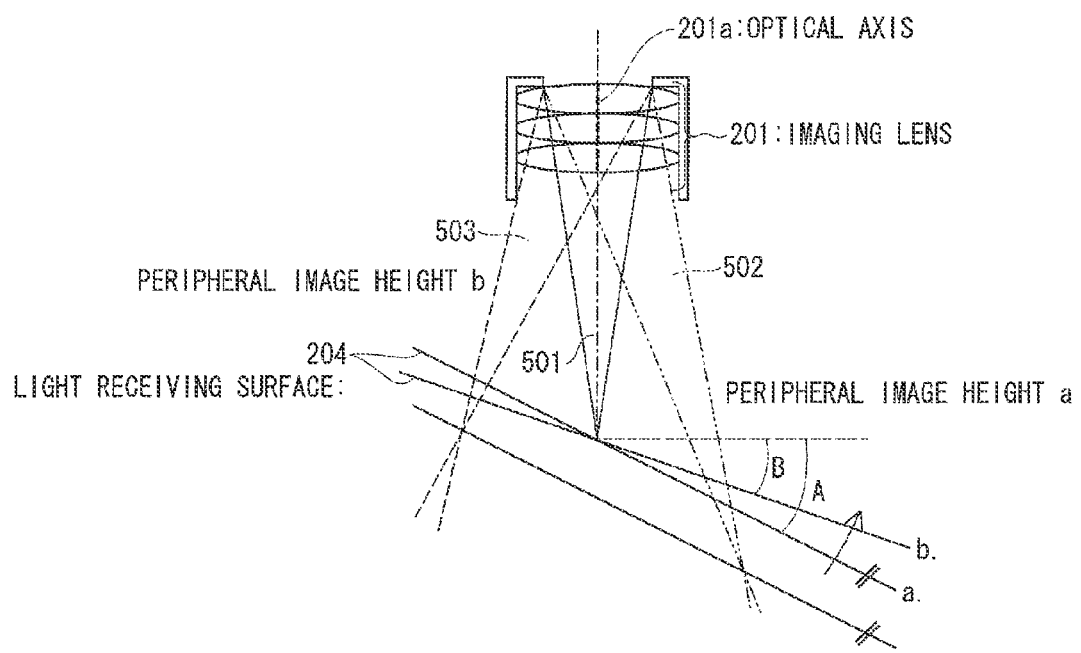
FIG. 5 is a diagram illustrating a principle in which a one-sided blur is adjusted with use of the position adjusting device illustrated in FIG. 1.
Figure 6:
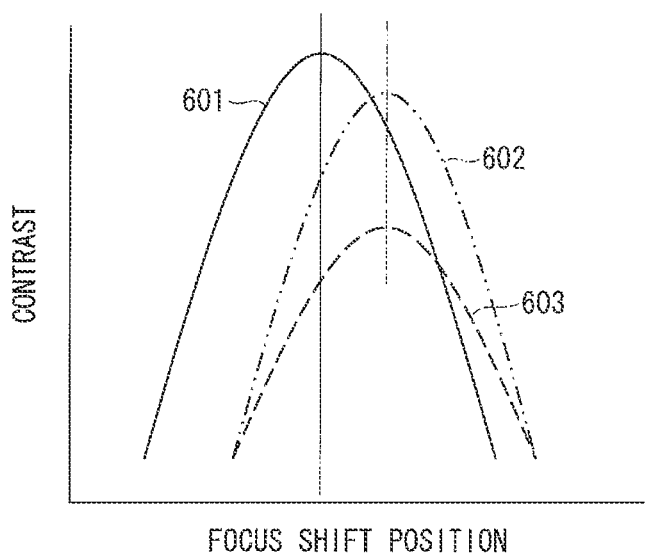
FIG. 6 is a graph showing a principle in which a one-sided blur is adjusted with use of the position adjusting device illustrated in FIG. 1.
Figure 7:
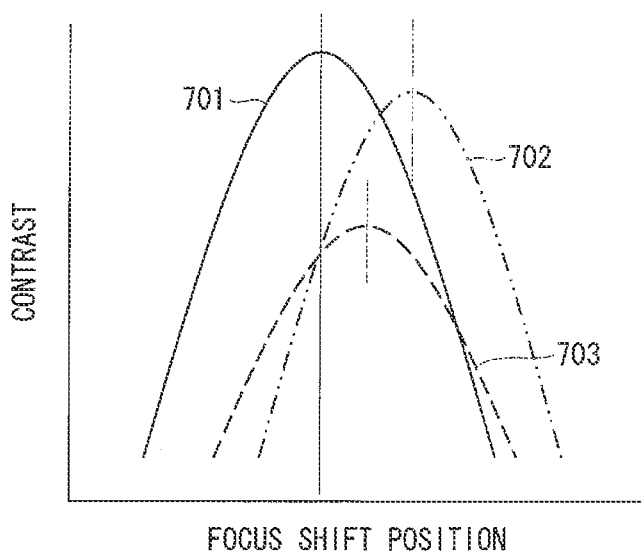
FIG. 7 is a graph showing a principle in which a one-sided blur is adjusted with use of the position adjusting device illustrated in FIG. 1.

FIGS. 5 through 7 are each a diagram illustrating a principle in which a one-sided blur is adjusted with use of the position adjusting device illustrated in FIG. 1.

In a case where the imaging lens 201 has rotationally asymmetric aberration with respect to the optical axis 201a, a one-sided blur may occur with mere use of the conventional technique of corresponding, with each other, image surface positions allowing the largest resolving power at the image heights.

FIG. 5 shows (i) a case where the image pickup device 202 (not illustrated for the convenience of description) is disposed so as to have a light receiving surface 204 at the rotational angle A and (ii) a case where the image pickup device 202 is disposed so as to have a light receiving surface 204 at the rotational angle B. Moreover, in FIG. 5, light corresponding to the center of the captured image is 501, light corresponding to the "peripheral image height a" in the captured image is 502, and light corresponding to the "peripheral image height b" in the captured image is 503.

FIG. 6 shows an example case where a one-sided blur occurs when the light receiving surface 204 has the rotational angle A. FIG. 6 shows a defocus characteristic 601 corresponding to the center of the captured image, a defocus characteristic 602 corresponding to the "peripheral image height a" in the captured image, and a defocus characteristic 603 corresponding to the "peripheral image height b" in the captured image. The example of FIG. 6 shows a coincidence between (i) a focus shift position at which the contrast peaks for the defocus characteristic 602 and (ii) a focus shift position at which the contrast peaks for the defocus characteristic 603. However, as illustrated in FIG. 5, the light receiving surface 204 is inclined by the rotational angle A. As a result, there is a difference in the position along the optical axis 201a between (i) that portion of the light receiving surface 204 which corresponds to the "peripheral image height a" and (ii) that portion of the light receiving surface 204 which corresponds to the "peripheral image height b". As a result, there is a difference in contrast between the "peripheral image height a" and the "peripheral image height b" in the captured image. This difference causes a one-sided blur in the captured image.

FIG. 7 shows an example case where a one-sided blur is reduced when the light receiving surface 204 has the rotational angle B. FIG. 7 shows a defocus characteristic 701 corresponding to the center of the captured image, a defocus characteristic 702 corresponding to the "peripheral image height a" in the captured image, and a defocus characteristic 703 corresponding to the "peripheral image height b" in the captured image. The example of FIG. 7 shows no coincidence between (i) a focus shift position at which the contrast peaks for the defocus characteristic 702 and (ii) a focus shift position at which the contrast peaks for the defocus characteristic 703. Further, as illustrated in FIG. 5, the light receiving surface 204 is inclined by the rotational angle B. As a result, there is a difference in the position along the optical axis 201a between (i) that portion of the light receiving surface 204 which corresponds to the "peripheral image height a" and (ii) that portion of the light receiving surface 204 which corresponds to the "peripheral image height b". A one-sided blur can be reduced in a case where the defocus characteristics 702 and 703 are adjusted so as to be compatible with a difference in the position along the optical axis 201a between the above portions of the light receiving surface 204.

As described above, the example of FIG. 7 involves a difference in the image surface position allowing the largest resolving power between the image heights. In a case where the defocus characteristics corresponding to their respective image heights are generally identical to each other, the operation of the above described position adjusting device may allow the image surface positions allowing the largest resolving power at the image heights to be identical to each other, as in the conventional techniques.

The position adjusting device illustrated in FIG. 1 adjusts the rotational angle of the image pickup device 202 such that the contrast at the "peripheral image height a" and the contrast at the "peripheral image height b" in the captured image are identical to each other. This adjustment allows a one-sided blur to be reduced according to the principle illustrated in FIG. 7.

(Verification by Simulation)

Verification by simulation of the position adjusting device illustrated in FIG. 1 is described with reference to FIGS. 8 through 28.

[Verification 1]

FIG. 8 is a table that shows design data and design conditions for the camera module 200. In FIG. 8, "Spec." indicates the configuration of the camera module 200, which included an image pickup device 202 of 1/2.5 type and 20M class and an imaging lens 201 having five lenses. In FIG. 8, "Object distance" indicates a distance between the imaging lens 201 and an object and was set at a relatively short distance of 500 mm. In FIG. 8, "FOV(D)/2" is a half width of an angle of view in a diagonal direction, and was set at 37 degrees.

Moreover, in FIG. 8, "Image height" indicates an image height of the captured image. a largest image height of h1.0 was 376.8 mm, and an image height h0.6 was 226.1 mm. Furthermore, the location of the "peripheral image height a" and the location of the "peripheral image height b" were each set at a location at the image height h0.6. For the convenience of description, the image height h0.6 of the "peripheral image height a" is referred to as image height h0.6, and the image height h0.6 of the "peripheral image height b" is referred to as image height –h0.6.

Figure 9:
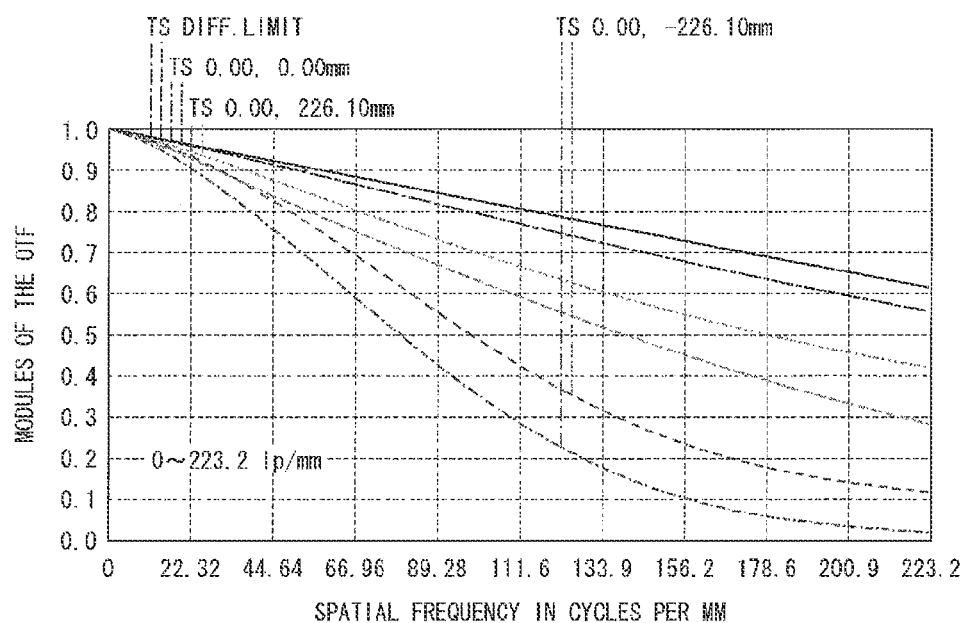
FIG. 9 is a graph, as to Verification 1, showing a relationship between a spatial frequency and a modulation transfer function (MTF) for a case where the image pickup device has, with respect to the optical axis, a slope of 15 min as an initial value of the rotational angle of the image pickup device.

FIG. 9 is a graph showing a relationship between a spatial frequency (horizontal axis, unit: lp/mm) and a MTF (vertical axis) for a case where the image pickup device 202 has, with respect to the optical axis 201a, a slope of 15 min as an initial value of the rotational angle of the image pickup device 202. Hereinafter, when the relationship between the spatial frequency and the MTF is showed, the spatial frequency ranges from 0 to 223.2 lp/mm.

Figure 10:
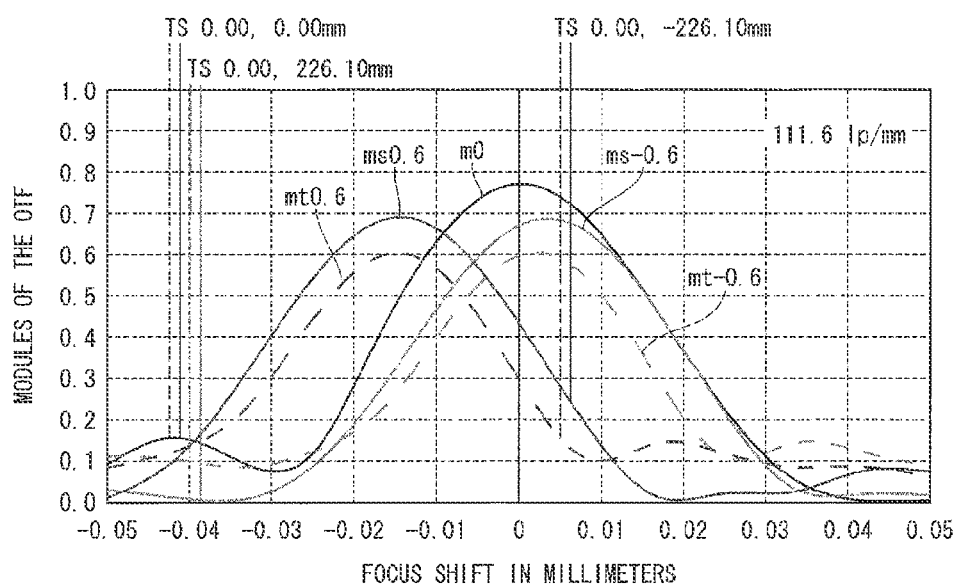
FIG. 10 is a graph, as to Verification 1, showing a relationship between a focus shift position and a MTF for a case where the image pickup device has, with respect to the optical axis, a slope of 15 min as an initial value of the rotational angle of the image pickup device.

FIG. 10 is a graph showing a relationship between a focus shift position (horizontal axis, unit: mm) and a MTF (vertical axis) for a case where the image pickup device 202 has, with respect to the optical axis 201a, a slope of 15 min as an initial value of the rotational angle of the image pickup device 202. In other words, FIG. 10 shows a defocus MTF for a case where the image pickup device 202 has a slope of 15 min with respect to the optical axis 201a. Hereinafter, each defocus MTF is a characteristic for a case where the spatial frequency is 111.6 lp/mm.

Moreover, some of the drawings show (i) m0 representing a characteristic at an image height h0 (central image height), (ii) ms0.6 representing a characteristic of a sagittal image surface at an image height h0.6, (iii) mt0.6 representing a characteristic of a tangential image surface at the image height h0.6, (iv) ms–0.6 representing a characteristic of a sagittal image surface at an image height –h0.6, and (v) mt–0.6 representing a characteristic of a tangential image surface at the image height –h0.6.

After an image was captured at the initial value of the rotational angle of the image pickup device 202, the image pickup device rotating and holding section 101 rotated the image pickup device 202, and provided a slope of 10 min with respect to the initial value of the rotational angle of the image pickup device 202. The center of the slope was determined as the center of a surface (hereinafter referred to as "S10 center") of, out of the lenses constituting the imaging lens 201, a fifth lens from the object side which surface faces the image pickup device 202 side.

Figure 11:
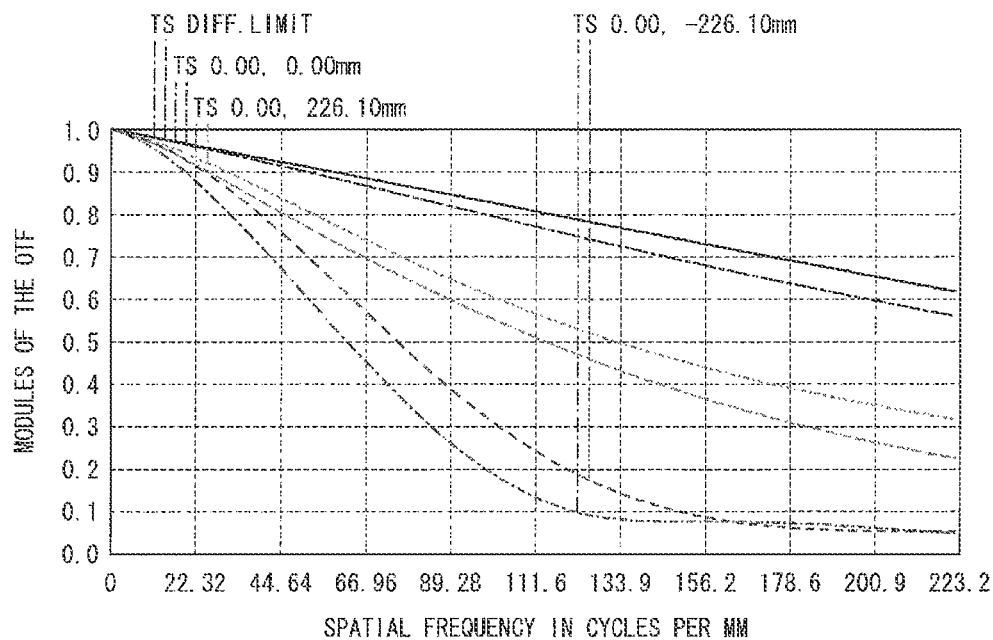
FIG. 11 is a graph, as to Verification 1, showing a relationship between a spatial frequency and a MTF for a case where the image pickup device is inclined, from the initial value with respect to the optical axis, by 10 min as "Measurement 1" of the rotational angle of the image pickup device.

FIG. 11 is a graph showing a relationship between a spatial frequency (horizontal axis) and a MTF (vertical axis) for a case where the image pickup device 202 is inclined, from the initial value with respect to the optical axis 201a, by 10 min as a "Measurement 1" of the rotational angle of the image pickup device 202.

Figure 12:
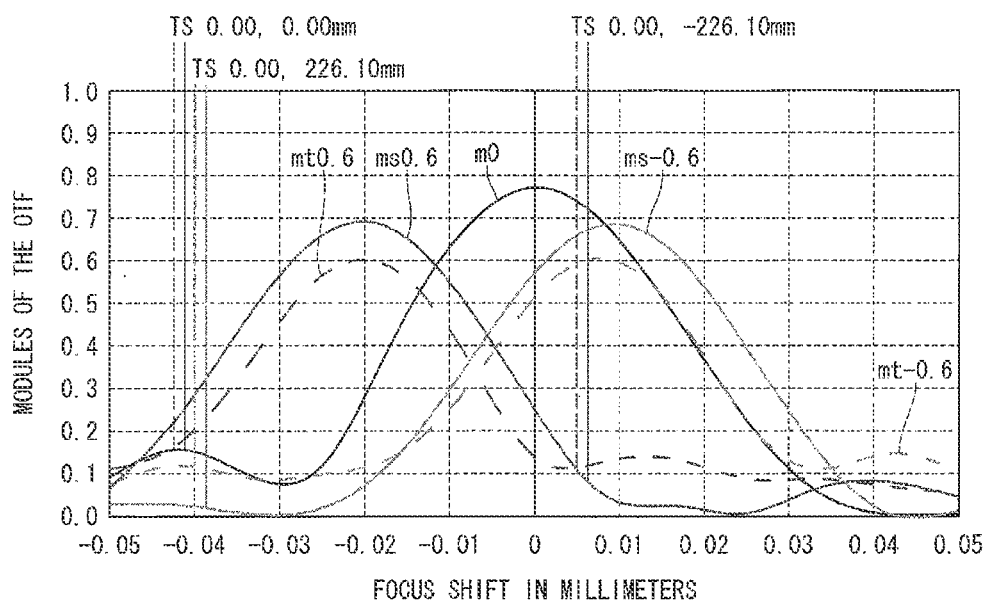
FIG. 12 is a graph, as to Verification 1, showing a relationship between a focus shift position and a MTF in a case where the image pickup device is inclined, from the initial value with respect to the optical axis, by 10 min as a "Measurement 1" of the rotational angle of the image pickup device.

FIG. 12 is a graph showing a relationship between a focus shift position (horizontal axis) and a MTF (vertical axis) for a case where the image pickup device 202 is inclined, from the initial value with respect to the optical axis 201a, by 10 min as a "Measurement 1" of the rotational angle of the image pickup device 202. In other words, FIG. 12 shows a defocus MTF for a case where the image pickup device 202 is inclined by 10 min from the initial value with respect to the optical axis 201a.

After an image was captured at the "Measurement 1" of the rotational angle of the image pickup device 202, the image pickup device rotating and holding section 101 rotated the image pickup device 202, and provided a slope of −10 min with respect to the initial value of the rotational angle of the image pickup device 202. In other words, the slope of −20 min was provided with respect to the "Measurement 1" of the rotational angle of the image pickup device 202.

Figure 13:
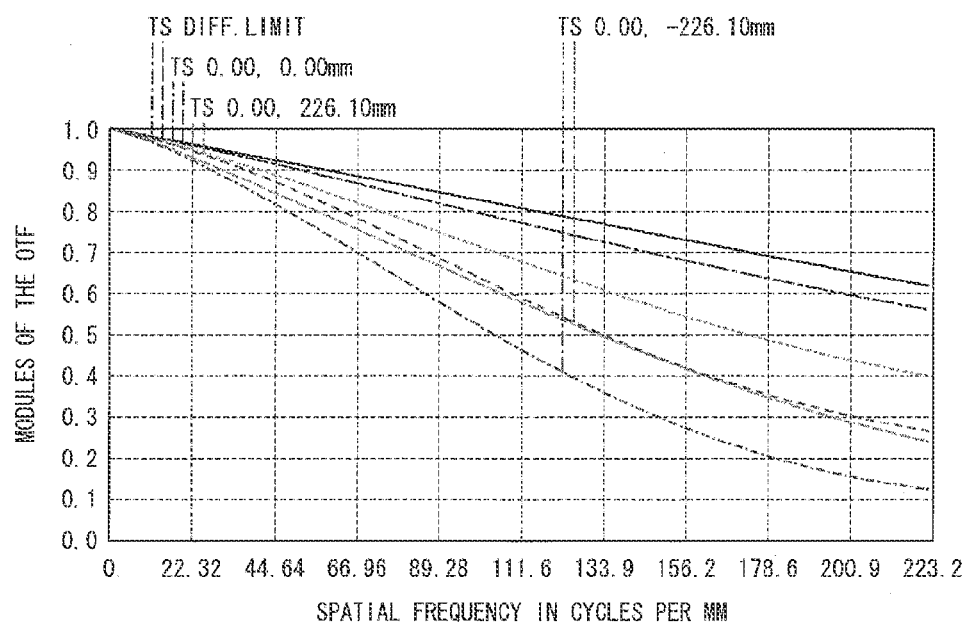
FIG. 13 is a graph showing, as to Verification 1, showing a relationship between a spatial frequency and a MTF in a case where the image pickup device is inclined, from the initial value with respect to the optical axis, by −10 min as a "Measurement 2" of the rotational angle of the image pickup device.

FIG. 13 is a graph showing a relationship between a spatial frequency (horizontal axis) and a MTF (vertical axis) for a case where the image pickup device 202 is inclined, from the initial value with respect to the optical axis 201a, by −10 min as a "Measurement 2" of the rotational angle of the image pickup device 202.

Figure 14:
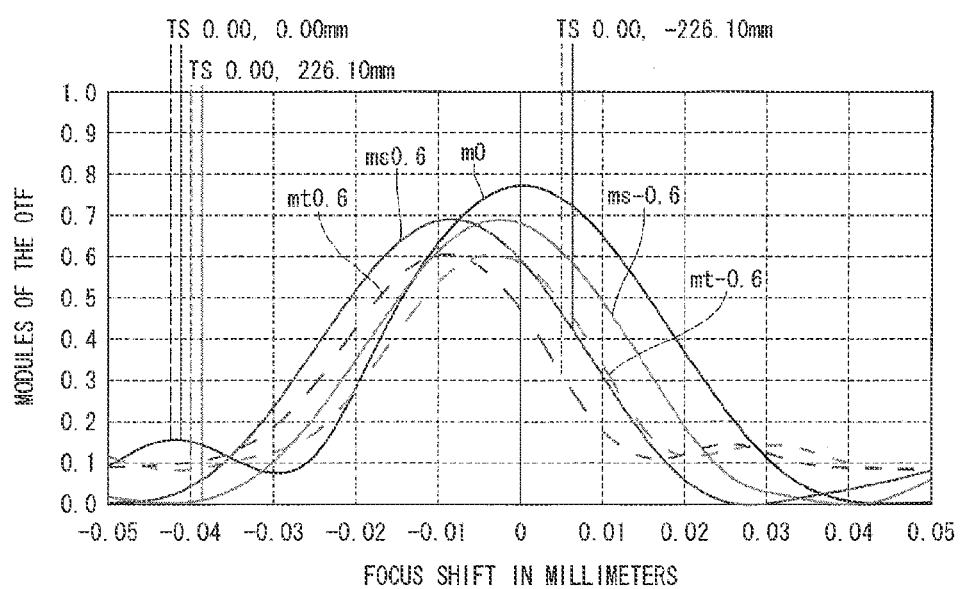
FIG. 14 is a graph showing, as to Verification 1, showing a relationship between a focus shift position and a MTF in a case where the image pickup device inclined, from the initial value with respect to the optical axis, by −10 min as a "Measurement 2" of the rotational angle of the image pickup device.

FIG. 14 is a graph showing a relationship between a focus shift position (horizontal axis) and a MTF (vertical axis) for a case where the image pickup device 202 is inclined, from the initial value with respect to the optical axis 201a, by −10 min as a "Measurement 2" of the rotational angle of the image pickup device 202. In other words, FIG. 14 shows a defocus MTF for a case where the image pickup device 202 is inclined by −10 min from the initial value with respect to the optical axis 201a.

After an image was captured at the "Measurement 2" of the rotational angle of the image pickup device 202, the relationship information obtaining section 103 and the line approximation section 104 performed curve approximation on the captured image on the basis of the defocus MTFs illustrated in respective FIGS. 10, 12, and 14. The curve approximation produced results shown in the graph of FIG. 15.

The graph as illustrated in FIG. 15 has (i) a horizontal axis indicative of the rotational angle (tilt to initial) of the image pickup device 202 with respect to the initial value with the unit of "min" and (ii) a vertical axis indicative of a MTF (contrast).

Here, in FIG. 15, in a case where the rotational angle of the image pickup device 202 from the initial value is approximately −14.5 min, (i) the approximation line for ms0.6 and the approximation line for ms−0.6 cross each other, and (ii) the approximation line for mt0.6 and the approximation line for mt−0.6 cross each other.

The image pickup device adjustment section 105 rotates the image pickup device 202 so that the rotational angle is −14.5 min with respect to the initial value, and thus adjusts the position of the image pickup device 202.

Figure 16:
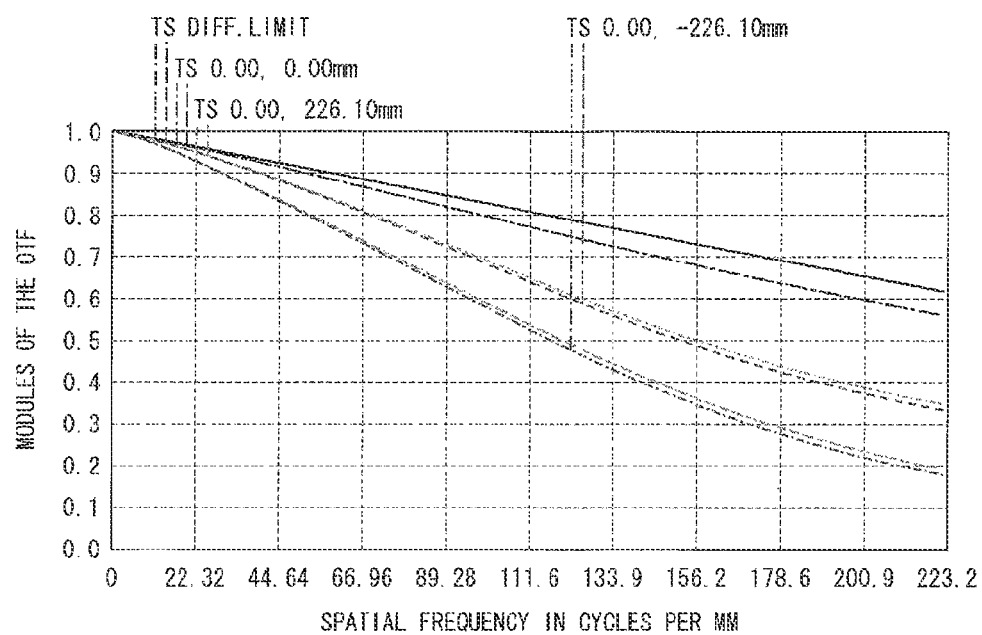
FIG. 16 is a graph showing, as to Verification 1, a relationship between a spatial frequency and a MTF which relationship is achieved after the image pickup device adjusting section has adjusted the position of the image pickup device.

FIG. 16 is a graph showing a relationship between a spatial frequency (horizontal axis) and a MTF (vertical axis) which relationship is achieved after the image pickup device adjusting section 105 has adjusted the position of the image pickup device 202.

Figure 17:
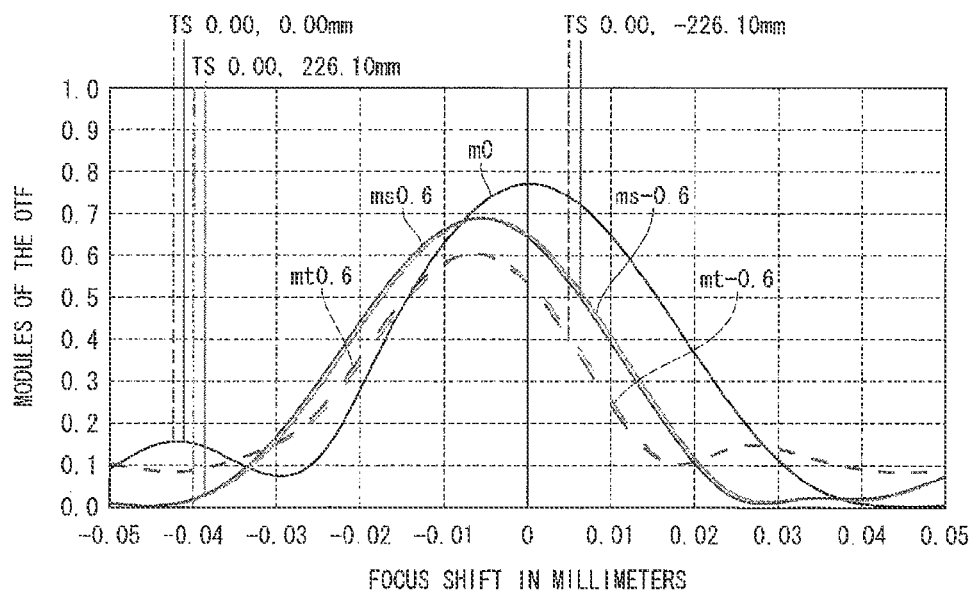
FIG. 17 is a graph showing, as to Verification 1, a relationship between a focus shift position and a MTF which relationship is achieved after the image pickup device adjusting section has adjusted the position of the image pickup device.

FIG. 17 is a graph showing a relationship between a focus shift position (horizontal axis) and a MTF (vertical axis) which relationship is achieved after the image pickup device adjusting section 105 has adjusted the position of the image pickup device 202, that is, a graph showing a defocus MTF. FIG. 17 shows that after the position adjusting device illustrated in FIG. 1 has adjusted the rotational angle of the image pickup device 202 appropriately, the focus shift positions at which respective MTFs at ms0.6, mt0.6, ms−0.6, and mt−0.6 are the largest are located at an almost identical position as compared with the defocus MTFs illustrated in FIG. 10.

This simulation used the s10 center as the center of the slope. In such cases, the center defocus that has occurred during a tilt causes an error of 0.5 min. Specifically, a relative slope of the imaging lens 201 and the image pickup device 202 is adjusted desirably with reference to an intersection between an extension of the optical axis 201a and the light receiving surface 204. However, it is not easy to find where the intersection actually is. In order to ensure that the assumption is easier for a case where the slope is appropriately changed, the simulation used s10 center as the center of the slope. Since the light receiving surface 204 was inclined by 15 min with respect to the optical axis 201a at the initial value, the calculation should best produce results based on an inclination of 15 min. However, since the simulation determined the s10 center as the center of the slope in setting a relative slope, adjustment was made in an amount of −14.5 min, with the result of an error of 0.5 min. This error, however, causes no practical problem because it is small as a displacement of the center of the slope.

[Verification 2]

Design data and design conditions for a camera module 200 of Verification 2 were as shown in the table of FIG. 8. Verification 2 discusses an example case where manufacturing tolerance causes errors below in the configuration of the imaging lens 201 of this camera module 200.

A shift of an optical axis of a lens that is included in the imaging lens 201 and that is the closest to the object which shift is to a direction perpendicular to the optical axis 201a: 1.5 μm A shift of an optical axis of a lens that is included in the imaging lens 201 and that is the second closest to the object which shift is to a direction perpendicular to the optical axis 201a: 1 μm A displacement of the optical axis of the lens that is included in the imaging lens 201 and that is the second closest to the object which displacement is with respect to the lens that is included in the imaging lens 201 and that is the closest to the object: −1 μm Verification 2 used the shift and displacement (so called parallel deflection) as errors because the shift and displacement of the optical axis have a relatively large influence on variations in the image surface and asymmetry in aberration in the imaging lens 201.

Figure 18:
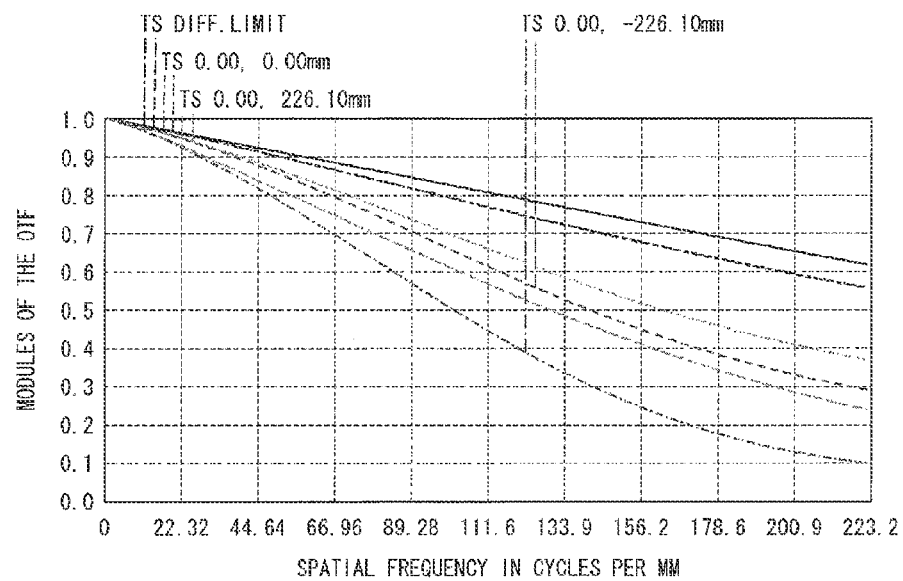
FIG. 18 is a graph showing, as to Verification 2, a relationship between a spatial frequency and a MTF for a case where the image pickup device is perpendicular to an optical axis as an initial value of the rotational angle of the image pickup device.

FIG. 18 is a graph showing a relationship between a spatial frequency (horizontal axis) and a MTF (vertical axis) for a case where the image pickup device 202 is perpendicular to the optical axis 201a (that is, the image pickup device 202 has a slope of 0 min with respect to the optical axis 201a) as the initial value of the rotational angle of the image pickup device 202. The graph illustrated in FIG. 18 is generally identical to the graph illustrated in FIG. 9 except the rotational angle of the image pickup device 202.

Figure 19:
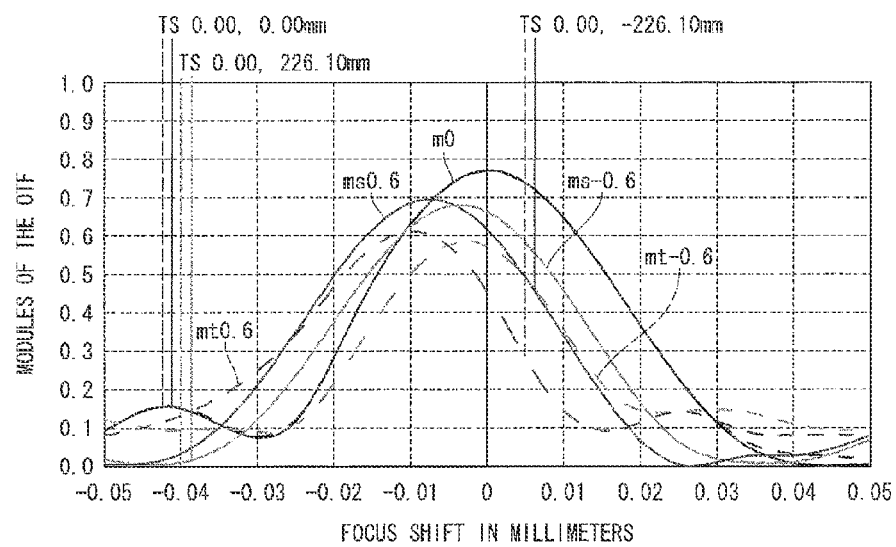
FIG. 19 is a graph showing, as to Verification 2, a relationship between a focus shift position and a MTF for a case where the image pickup device is perpendicular to an optical axis, as an initial value of the rotational angle of the image pickup device.

FIG. 19 is a graph showing a relationship between a focus shift position (horizontal axis) and a MTF (vertical axis) for a case where the image pickup device 202 is perpendicular to the optical axis 201a as the initial value of the rotational angle of the image pickup device 202. The graph illustrated in FIG. 19 is generally identical to the graph illustrated in FIG. 10 except the rotational angle of the image pickup device 202.

After an image was captured at the initial value of the rotational angle of the image pickup device 202, the image pickup device rotating and holding section 101 rotated the image pickup device 202, and provided a slope of 10 min with respect to the initial value of the rotational angle of the image pickup device 202. Note that s10 center was determined as the center of the slope.

Figure 20:
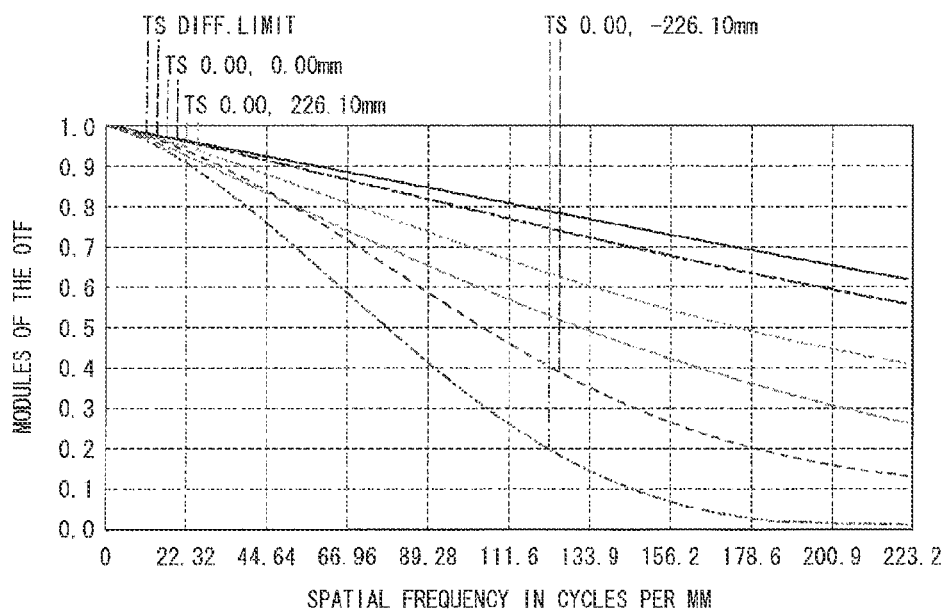
FIG. 20 is a graph showing, as to Verification 2, a relationship between a spatial frequency and a MTF for a case where the image pickup device is inclined, from the initial value with respect to the optical axis, by 10 min as a "Measurement 1" of the rotational angle of the image pickup device.

FIG. 20 is a graph showing a relationship between a spatial frequency (horizontal axis) and a MTF (vertical axis) for a case where the image pickup device 202 is inclined, from the initial value with respect to the optical axis 201a, by 10 min as a "Measurement 1" of the rotational angle of the image pickup device 202. The graph illustrated in FIG. 20 is generally identical to the graph illustrated in FIG. 11 except the rotational angle of the image pickup device 202.

Figure 21:
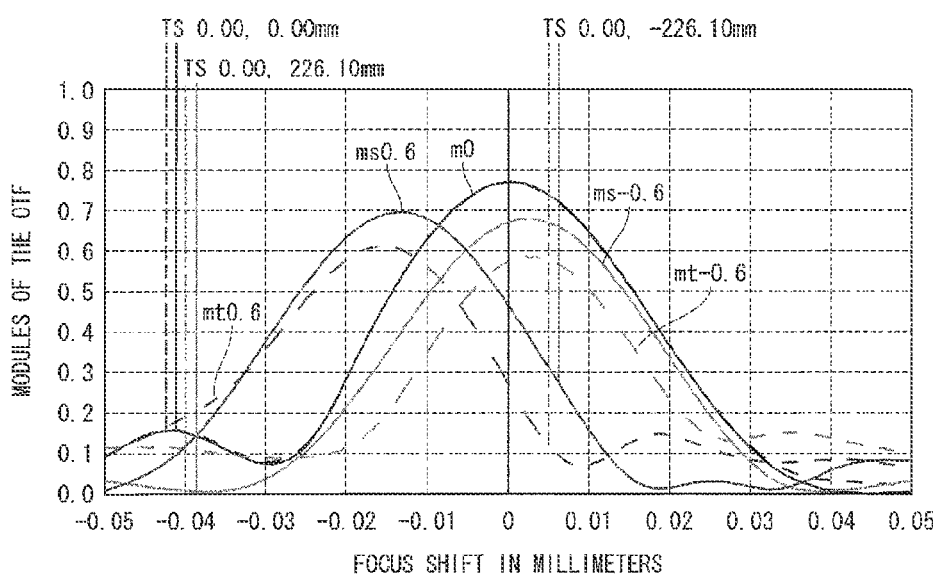
FIG. 21 is a graph showing, as to Verification 2, a relationship between a focus shift position and a MTF for a case where the image pickup device inclined, from the initial value with respect to the optical axis, by 10 min as a "Measurement 1" of the rotational angle of the image pickup device.

FIG. 21 is a graph showing a relationship between a focus shift position (horizontal axis) and a MTF (vertical axis) for a case where the image pickup device 202 is inclined, from the initial value with respect to the optical axis 201a, by 10 min as a "Measurement 1" of the rotational angle of the image pickup device 202. The graph illustrated in FIG. 21 is generally identical to the graph illustrated in FIG. 12 except the rotational angle of the image pickup device 202.

After an image was captured at the "Measurement 1" of the rotational angle of the image pickup device 202, the image pickup device rotating and holding section 101 rotated the image pickup device 202, and provided a slope of −10 min with respect to the initial value of the rotational angle of the image pickup device 202. In other words, the slope of −20 min was provided with respect to the "Measurement 1" of the rotational angle of the image pickup device 202.

FIG. 22 is a graph showing a relationship between a spatial frequency (horizontal axis) and MTF (vertical axis) in a case where the image pickup device 202 is inclined, from the initial value with respect to the optical axis 201a, by −10 min as a "Measurement 2" of the rotational angle of the image pickup device 202. The graph illustrated in FIG. 22 is generally identical to the graph illustrated in FIG. 13 except the rotational angle of the image pickup device 202.

FIG. 23 is a graph showing a relationship between a focus shift position (horizontal axis) and a MTF (vertical axis) for a case where the image pickup device 202 is inclined, from the initial value with respect to the optical axis 201a, by −10 min as a "Measurement 2" of the rotational angle of the image pickup device 202. The graph illustrated in FIG. 23 is generally identical to the graph illustrated in FIG. 14 except the rotational angle of the image pickup device 202.

After an image was captured at the "Measurement 2" of the rotational angle of the image pickup device 202, the relationship information obtaining section 103 and the line approximation section 104 performed curve approximation on the captured image on the basis of the defocus MTFs illustrated in respective FIGS. 19, 21, and 23. The curve approximation produced results shown in the graph of FIG. 24. The graph illustrated in FIG. 24 is identical to the graph illustrated in FIG. 15.

Here, in FIG. 24, in a case where the rotational angle of the image pickup device 202 from the initial value is approximately −2.5 min, the approximation line for ms0.6 and the approximation line for ms−0.6 cross each other. In FIG. 24, in a case where the rotational angle of the image pickup device 202 from the initial value is approximately −5.5 min, the approximation line for mt0.6 and the approximation line for mt−0.6 cross each other.

In a case where the graph shown in FIG. 24 is obtained, as a first option of adjustment, the image pickup device adjustment section 105 rotates the image pickup device 202 so that the rotational angle is −5.5 min with respect to the initial value, and thus adjusts the position of the image pickup device 202.

Figure 25:
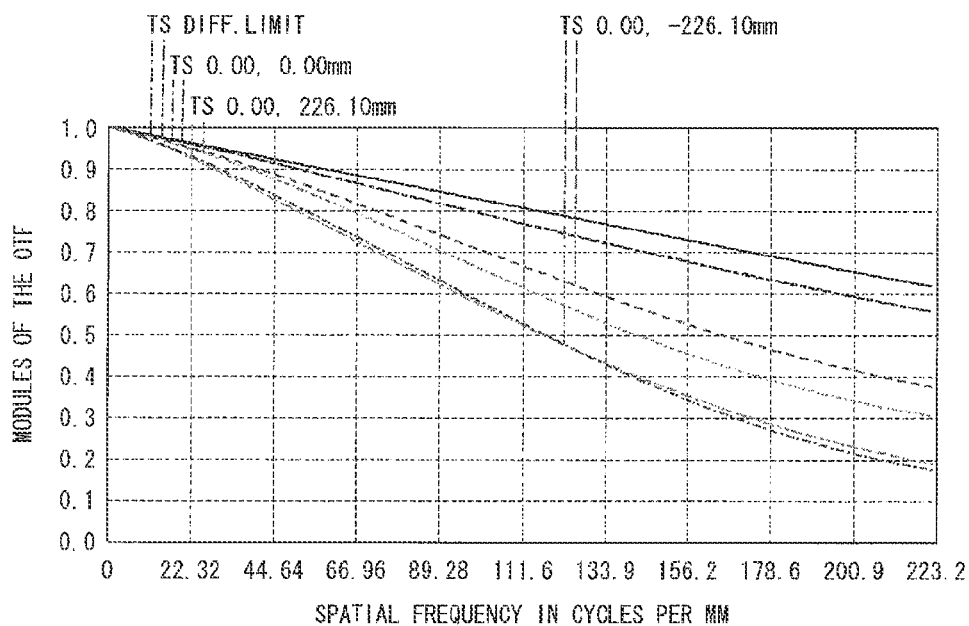
FIG. 25 is a graph showing, as to Verification 2 and the first option of adjustment, a relationship between a spatial frequency and a MTF which relationship is achieved after the image pickup device adjusting section has adjusted the position of the image pickup device.

FIG. 25 is a graph showing, as to the first option of adjustment, a relationship between a spatial frequency (horizontal axis) and a MTF (vertical axis) which relationship is achieved after the image pickup device adjusting section 105 has adjusted the position of the image pickup device 202.

Figure 26:
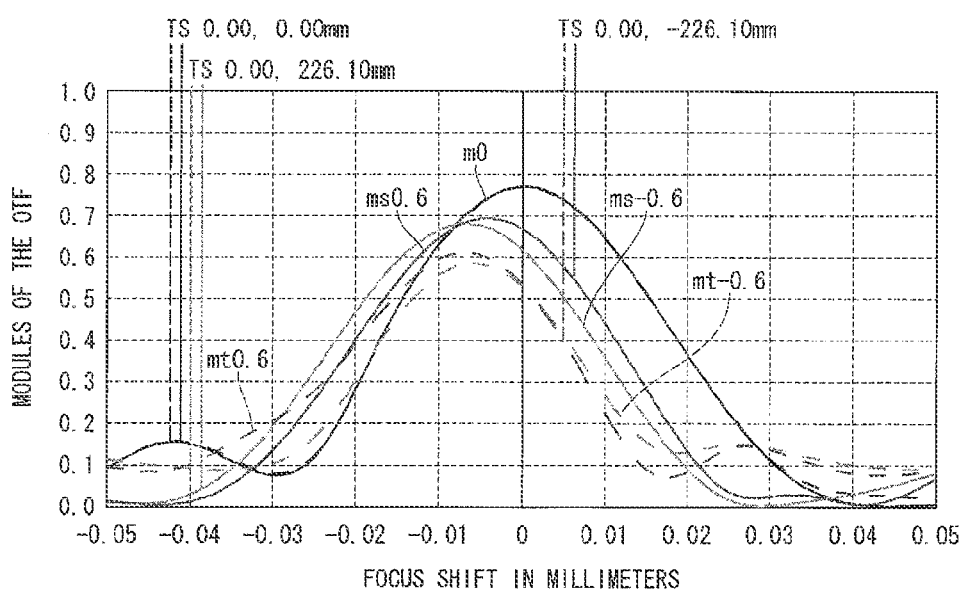
FIG. 26 is a graph showing, as to Verification 2 and the first option of adjustment, a relationship between a focus shift position and a MTF which relationship is achieved after the image pickup device adjusting section has adjusted the position of the image pickup device.

FIG. 26 is a graph showing, as to the first choice of adjustment, a relationship between a focus shift position (horizontal axis) and a MTF (vertical axis) which relationship is achieved after the image pickup device adjusting section 105 has adjusted the position of the image pickup device 202.

Moreover, as a second option of adjustment, the image pickup device adjustment section 105 rotates the image pickup device 202 so that the rotational angle is −2.5 min with respect to the initial value, and thus adjusts the position of the image pickup device 202.

Figure 27:
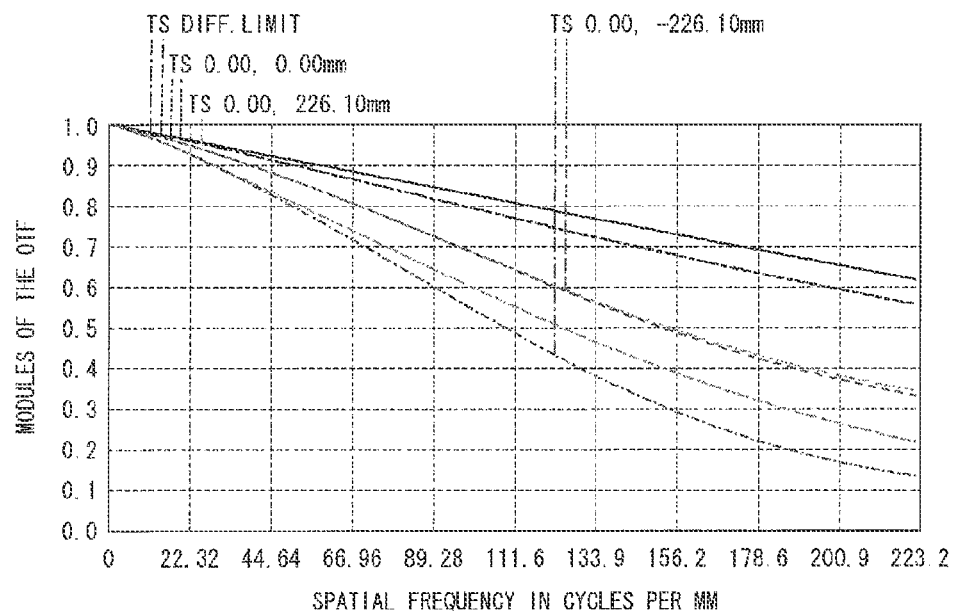
FIG. 27 is a graph showing, as to Verification 2 and the second option of adjustment, a relationship between a spatial frequency and a MTF which relationship is achieved after the image pickup device adjusting section has adjusted the position of the image pickup device.

FIG. 27 is a graph showing, as to the second option of adjustment, a relationship between a spatial frequency (horizontal axis) and a MTF (vertical axis) which relationship is achieved after the image pickup device adjusting section 105 has adjusted the position of the image pickup device 202.

Figure 28:
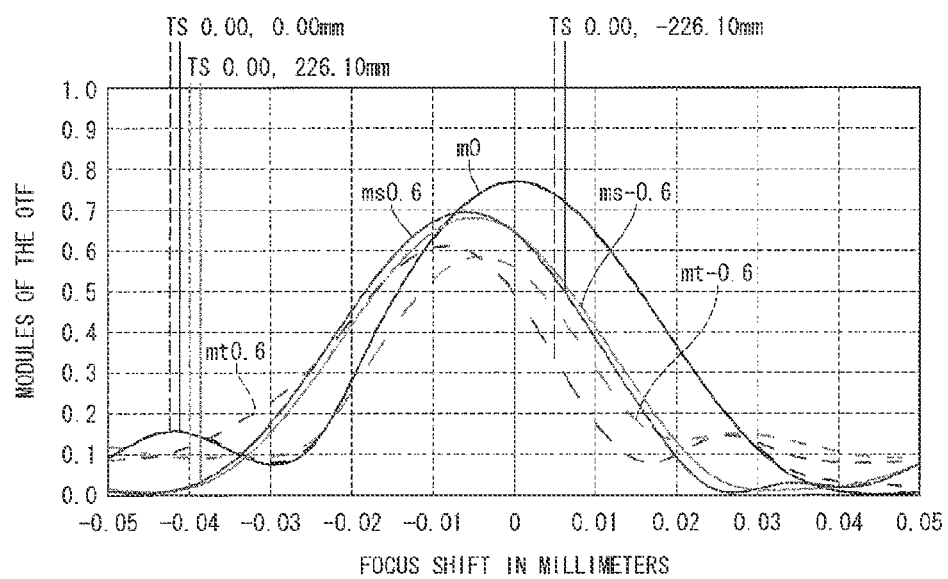
FIG. 28 is a graph showing, as to Verification 2 and the second option of adjustment, a relationship between a focus shift position and a MTF which relationship is achieved after the image pickup device adjusting section has adjusted the position of the image pickup device.

FIG. 28 is a graph showing, as to the second choice of adjustment, a relationship between a focus shift position (horizontal axis) and a MTF (vertical axis) which relationship is achieved after the image pickup device adjusting section 105 has adjusted the position of the image pickup device 202.

(Supplementary Note)

The present embodiment discusses an example case where the image pickup device rotating and holding section 101 holds the image pickup device 202 at any of three rotational angles. However, the image pickup rotating and holding section 101 may hold the image pickup device 202 at any of more than three rotational angles. A larger number of rotational angles available allows more precision in adjustment of respective positions of the imaging lens and the image pickup device relative to each other, but requires a longer time period for the adjustment. Therefore, the number of rotational angles may be determined on the basis of the intended precision in adjustment and the intended period of the adjustment time.

(Conclusion)

In order to solve the above problems, a position adjusting device according to an aspect of the present invention is a position adjusting device for adjusting a relative positional relationship between an imaging lens 201 and an image pickup device 202, the position adjusting device including: an image pickup device rotating and holding section 101 for rotating the image pickup device 202 and holding the image pickup device 202 at any one of at least three rotational angles, the rotational angles each being an angle of rotation from (i) an orientation in which the image pickup device 202 faces a direction perpendicular to an optical axis 201a of the imaging lens 201 to (ii) an orientation in which the image pickup device 202 faces a direction of the optical axis 201a; a relationship information obtaining section 103 for obtaining, for each of respective images captured at the rotational angles with use of the imaging lens 201 and the image pickup device 202, information on a relationship between a corresponding rotational angle and a contrast of the image at a plurality of points or regions in the image; a line approximation section 104 for performing approximation on the relationship with use of a straight line or a curve (curves 301 and 302); and an image pickup device adjusting section 105 for adjusting a position of the image pickup device 202 by rotating the image pickup device 202 so that the image pickup device 202 is held at that one of the rotational angles which corresponds to a position 303 at which a plurality of the straight lines or the curves obtained from the approximation by the line approximation section 104 cross each other.

The above arrangement makes it possible to adjust a relative positional relationship between the imaging lens and the image pickup device on the basis of the contrasts of the respective images captured at the rotation angles of the image pickup device. This in turn makes it possible to adjust a relative positional relationship between the imaging lens and the image pickup device on the basis of a minimum of three captured images.

With the above arrangement, the position adjusting device involves, during the adjustment, data in an amount reduced as compared to conventional techniques. The position adjusting device can thus adjust a relative positional relationship between the imaging lens and the image pickup device in a shorter period of time.

The above arrangement makes it possible to directly adjust a relative positional relationship between an imaging lens and an image pickup device while capturing an image with use of only an image pickup device to be mounted in a camera module as a finished product. Therefore, adjustment can be performed with high precision.

Furthermore, the above arrangement makes it possible to adjust the rotational angle of the image pickup device so that the contrast at one location in a captured image is equal to the contrast at another location in the captured image. This adjustment reduces a one-sided blur.

The position adjusting device according to the present invention is preferably arranged such that the line approximation section 104 performs the approximation with use of the line or the curve on a basis of any one of linear approximation, polynomial approximation, power approximation, and exponential approximation.

The position adjusting device according to the present invention is preferably arranged such that the plurality of points or regions are in point symmetry relationship with each other with respect to a center of the image.

The above arrangements each make it possible to unify the anisotropy of the contrast at the same image height in the captured images.

In order to solve the above problems, a position adjusting method according to the present invention is a position adjusting method for adjusting a relative positional relationship between an imaging lens 201 and an image pickup device 202, the position adjusting method including the steps of: (a) rotating the image pickup device 202 and holding the image pickup device 202 at any one of at least three rotational angles, the rotational angles each being an angle of rotation from (i) an orientation in which the image pickup device 202 faces a direction perpendicular to an optical axis 201*a* of the imaging lens 201 to (ii) an orientation in which the image pickup device 202 faces a direction of the optical axis 201*a*; (b) obtaining, for each of respective images captured at the rotational angles with use of the imaging lens 201 and the image pickup device 202, information on a relationship between a corresponding rotational angle and a contrast of the image at a plurality of points or regions in the image; (c) performing approximation on the relationship with use of a straight line or a curve (curves 301 and 302); and (d) adjusting a position of the image pickup device 202 by rotating the image pickup device 202 so that the image pickup device 202 is held at that one of the rotational angles which corresponds to a position 303 at which a plurality of the straight lines or the curves obtained from the approximation in the step (c) cross each other.

The above arrangement brings about advantageous effects similar to those of the position adjusting device according to any embodiment of the present invention.

The present invention is not limited to the description of the embodiments above, but may be altered by a skilled person within the scope of the claims. An embodiment based on a proper combination of technical means disclosed in different embodiments is encompassed in the technical scope of the present invention. Furthermore, a proper combination of technical means disclosed in different embodiments makes it possible to form a new technical feature.

INDUSTRIAL APPLICABILITY

The present invention is applicable to a position adjusting device and position adjusting method each for adjusting a relative positional relationship between an imaging lens and an image pickup device.

REFERENCE SIGNS LIST

101: Image pickup device rotating and holding section
102: Image obtaining section
103: Relationship information obtaining section
104: Line approximation section
105: Image pickup device adjusting section
200: Camera module
201: Imaging lens
201*a*: Optical axis
202: Image pickup device
301: Curve
302: Curve
303: Position at which a plurality of curves cross each other

The invention claimed is:

1. A position adjusting device for adjusting a relative positional relationship between an imaging lens and an image pickup device, the position adjusting device comprising:
    an image pickup device rotating and holding section for rotating the image pickup device and holding the image pickup device at any one of at least three rotational angles, the rotational angles each being an angle of rotation from (i) an orientation in which the image pickup device faces a direction perpendicular to an optical axis of the imaging lens to (ii) an orientation in which the image pickup device faces a direction of the optical axis;
    a relationship information obtaining section for obtaining, for each image captured at the at least three rotational angles with use of the imaging lens and the image pickup device, information on a relationship between one of the at least three rotational angles and a corresponding contrast of the image at a plurality of points or regions in the image;
    a line approximation section for performing approximation on the relationship with use of a straight line or a curve; and
    an image pickup device adjusting section for adjusting a position of the image pickup device by rotating the image pickup device so that the image pickup device is held at that one of the rotational angles which corresponds to a position at which a plurality of the straight lines or the curves obtained from the approximation cross each other.

2. The position adjusting device as set forth in claim 1, wherein the line approximation section performs the approximation with use of the line or the curve on a basis of any one of linear approximation, polynomial approximation, power approximation, and exponential approximation.

3. The position adjusting device as set forth in claim 1, wherein the plurality of points or regions are in point symmetry relationship with each other with respect to a center of the image.

4. A position adjusting method for adjusting a relative positional relationship between an imaging lens and an image pickup device, the position adjusting method comprising the steps of:

(a) rotating the image pickup device and holding the image pickup device at any one of at least three rotational angles, the rotational angles each being an angle of rotation from (i) an orientation in which the image pickup device faces a direction perpendicular to an optical axis of the imaging lens to (ii) an orientation in which the image pickup device faces a direction of the optical axis;

(b) obtaining, for each image captured at the at least three rotational angles with use of the imaging lens and the image pickup device, information on a relationship between one of the at least three rotational angles and a corresponding contrast of the image at plurality of points or regions in the image;

(c) performing approximation on the relationship with use of a straight line or a curve; and (d) adjusting a position of the image pickup device by rotating the image pickup device so that the image pickup device is held at that one of the rotational angles which corresponds to a position at which a plurality of the straight lines or the curves obtained from the approximation in the step (c) cross each other.

5. The position adjusting device as set forth in claim 2, wherein the plurality of points or regions are in point symmetry relationship with each other with respect to a center of the image.

* * * * *